United States Patent
Kuo et al.

(10) Patent No.: US 11,366,865 B1
(45) Date of Patent: Jun. 21, 2022

(54) DISTRIBUTED QUERYING OF COMPUTING HUBS

(71) Applicant: Amazon Technologies, Inc., Seattle, WA (US)

(72) Inventors: Calvin Yue-Ren Kuo, Mercer Island, WA (US); Chen Yang, Mercer Island, WA (US); Ankit Masrani, Seattle, WA (US); Feng Wang, Seattle, WA (US); Kyunghwan Choi, Seattle, WA (US); Robert Battle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 16/122,704

(22) Filed: Sep. 5, 2018

(51) Int. Cl.
| | |
|---|---|
| *G06F 16/9535* | (2019.01) |
| *G06F 16/27* | (2019.01) |
| *G06F 16/901* | (2019.01) |
| *H04L 12/28* | (2006.01) |
| *H04L 41/12* | (2022.01) |
| *H04L 67/12* | (2022.01) |
| *H04W 4/38* | (2018.01) |

(52) U.S. Cl.
CPC .......... *G06F 16/9535* (2019.01); *G06F 16/27* (2019.01); *G06F 16/901* (2019.01); *H04L 12/283* (2013.01); *H04L 12/2807* (2013.01); *H04L 12/2816* (2013.01); *H04L 12/2827* (2013.01); *H04L 41/12* (2013.01); *H04L 67/12* (2013.01); *H04L 2012/285* (2013.01); *H04W 4/38* (2018.02)

(58) Field of Classification Search
CPC .... G06F 16/9535; G06F 16/27; G06F 16/901; H04L 12/2816; H04L 2012/285; H04L 41/12; H04L 67/12; H04L 12/2807; H04L 12/2827; H04L 12/283; H04W 4/38
USPC .......................................................... 707/769
See application file for complete search history.

(56) References Cited

U.S. PATENT DOCUMENTS

| | | | |
|---|---|---|---|
| 10,057,243 B1 * | 8/2018 | Kumar | H04W 8/005 |
| 10,187,470 B2 * | 1/2019 | Moriguchi | H04W 4/70 |
| 2001/0049676 A1 * | 12/2001 | Kepler | G06F 16/2471 |
| 2003/0050924 A1 * | 3/2003 | Faybishenko | G06F 16/9535 |
| 2003/0088544 A1 * | 5/2003 | Kan | G06F 16/9535 |
| 2007/0055482 A1 * | 3/2007 | Goodermote | G06Q 30/04 |
| | | | 702/184 |
| 2012/0197911 A1 * | 8/2012 | Banka | G06F 16/951 |
| | | | 707/752 |

(Continued)

*Primary Examiner* — Dennis Truong
(74) *Attorney, Agent, or Firm* — Davis Wright Tremaine LLP

(57) ABSTRACT

A technology is described for distributed querying of computing hubs for device-generated data. In one example, computing hubs may provide a storage service to devices included in a local device network, and the devices may send device-generated data to the computing hubs to be stored by the storage service. A distributed query may be initiated by identifying the computing hubs that have the device-generated data stored on the computing hubs and sending a message containing query instructions to the computing hubs. The query instructions, when executed on the computing hubs, retrieve the device-generated data from the storage service included on the computing hubs, and the computing hubs may send the device-generated data to a service provider environment.

20 Claims, 10 Drawing Sheets

(56) References Cited

U.S. PATENT DOCUMENTS

| | | | |
|---|---|---|---|
| 2012/0215652 A1* | 8/2012 | Melvin | G06F 16/24575 705/26.1 |
| 2012/0249802 A1* | 10/2012 | Taylor | G06T 7/292 348/169 |
| 2014/0359035 A1* | 12/2014 | Wang | H04L 67/125 709/206 |
| 2015/0127300 A1* | 5/2015 | Bluming | G01D 21/02 702/189 |
| 2015/0156266 A1* | 6/2015 | Gupta | H04L 67/12 709/224 |
| 2015/0170501 A1* | 6/2015 | Mukherji | G06Q 30/018 340/573.1 |
| 2015/0248461 A1* | 9/2015 | Theeten | G06F 16/24568 707/718 |
| 2016/0197772 A1* | 7/2016 | Britt | H04W 12/001 370/254 |
| 2016/0253394 A1* | 9/2016 | Elias | H04L 67/12 707/719 |
| 2017/0005820 A1* | 1/2017 | Zimmerman | G05B 19/042 |
| 2017/0094033 A1* | 3/2017 | Sathyadevan | H04L 67/12 |
| 2017/0094592 A1* | 3/2017 | Tabatabaei | H04W 48/16 |
| 2017/0331898 A1* | 11/2017 | Lee | G06Q 30/0283 |
| 2018/0083836 A1* | 3/2018 | Kuo | H04L 67/12 |
| 2018/0089281 A1* | 3/2018 | Li | G06F 16/2471 |
| 2018/0165367 A1* | 6/2018 | Schmidt | G06F 16/951 |
| 2018/0197418 A1* | 7/2018 | Chu | G06Q 10/04 |
| 2018/0278710 A1* | 9/2018 | Sun | G06F 16/951 |
| 2018/0316555 A1* | 11/2018 | Salgueiro | G06N 20/00 |
| 2018/0337840 A1* | 11/2018 | Goyal | H04L 43/50 |
| 2019/0095491 A1* | 3/2019 | Bhattacharjee | G06F 16/2379 |
| 2019/0123967 A1* | 4/2019 | Dotchkoff | H04W 4/50 |
| 2019/0297474 A1* | 9/2019 | Orsini | H04W 4/021 |
| 2019/0361412 A1* | 11/2019 | Park | G06N 5/043 |

* cited by examiner

DISTRIBUTED QUERYING OF COMPUTING HUBS

BACKGROUND

Electronic devices and computing systems have become ever-present in many aspects of society. Devices may be found in the workplace, at home or at school. Computing systems may include computing and data storage systems to process and store data. Some computing systems have begun offering centralized, virtual computing options known as service provider environments that may reduce overall costs, improve availability, improve scalability, and reduce time to deploy new applications.

Advancements in communication technologies have allowed for even relatively simple electronic devices to communicate with other devices and computing systems included in a device network. For example, the Internet of Things (IoT) is the interconnection of computing devices scattered across the globe using Internet infrastructure. Such devices may be able to capture data, and securely communicate the data over a network to a centralized computing service in a service provider environment (e.g., "cloud" environment). In one example, the devices may send the data to a computing hub or computing node in a local device network, and the computing hub may forward the data received from the devices to the centralized computing service in the service provider environment.

DETAILED DESCRIPTION

Figure 1:
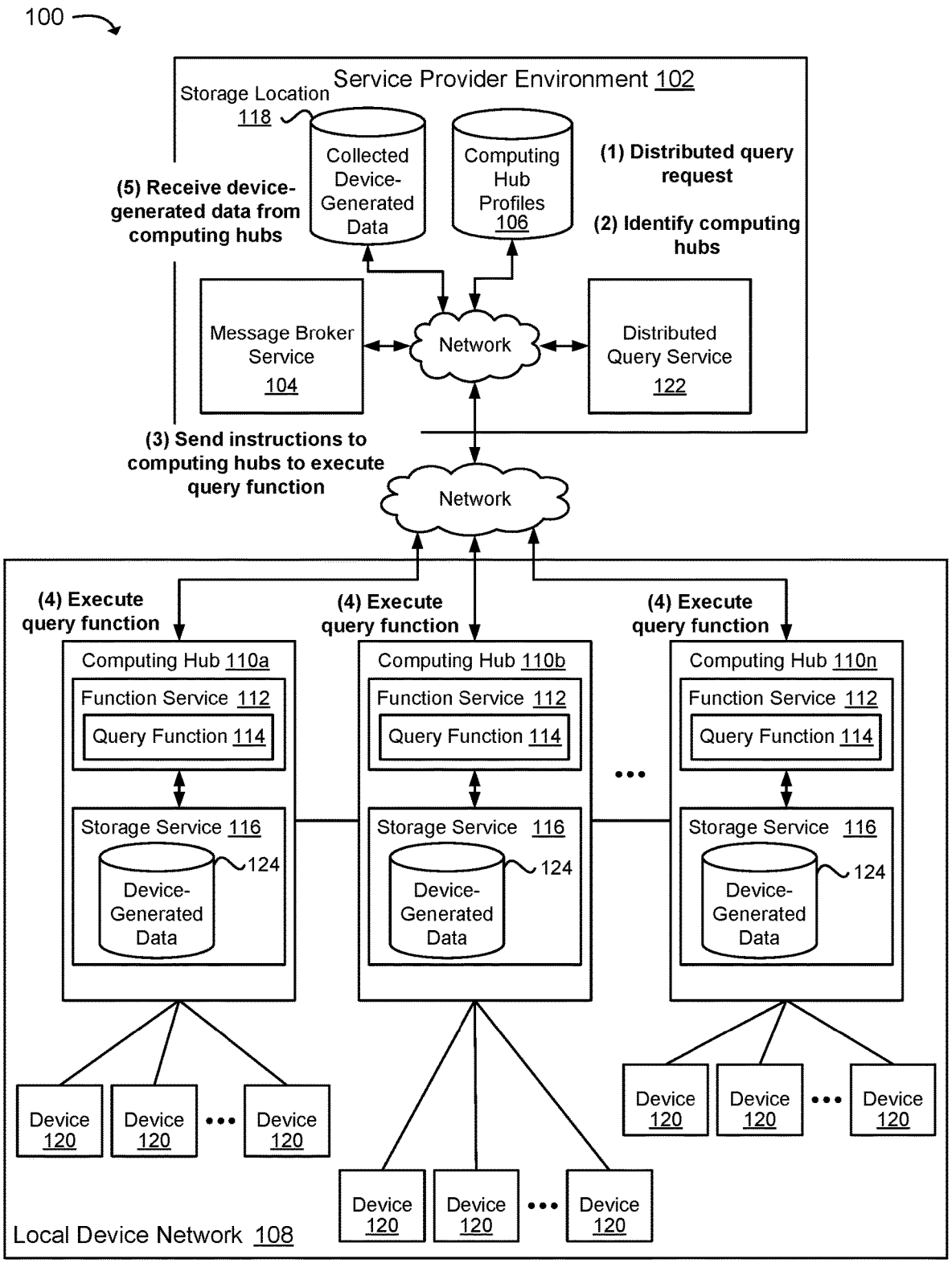
FIG. 1 is a block diagram that illustrates an example of a system and method for querying computing hubs for device-generated data using a program code function.

Technologies are described for distributed querying of computing hubs for device-generated data stored on the computing hubs. In one example configuration, a distributed query may be initiated by sending instructions to a group of computing hubs to execute a duplicated or similar program code function (e.g., a serverless function) on each of the computing hubs. The program code function, when executed on a computing hub, queries a storage service hosted on the computing hub for device-generated data and sends the device-generated data to a storage location in a service provider environment (e.g., a "cloud" environment), where the device-generated data may be aggregated with additional device-generated data received from other computing hubs included in the group of computing hubs. In one example, a user (e.g., a customer) may create a program code function to execute a data query for device-generated data, and the user may distribute the program code function to a group of computing hubs so that the program code function may be available on the computing hub to take part in a distributed query. In another example, a user may submit query parameters to a distributed query service and the query parameters may be used to generate a program code function that, when executed on a computing hub, queries a storage service on the computing hub using the query parameters. The distributed query service may identify a group of computing hubs that contain device-generated data specified in the query parameters and send copies of the program code function to the group of computing hubs.

In another example configuration, a distributed query for device-generated data may be initiated by publishing a message containing query parameters to a group of subscribed computing hubs which receive the device-generated data from connected devices. A computing hub may receive the message and provide the query parameters to a storage service hosted on the computing hub. The storage service may use the query parameters to execute a data query for the device-generated data stored on the computing hub, and in the case that the computing hub contains the device-generated data specified by the data query, the device-generated data may be sent to a storage location in a service provider environment, where the device-generated data may be aggregated with additional device-generated data received from other computing hubs included in the group of computing hubs.

A computing hub may be a physical or virtual device included in a local device network and the computing hub may be configured to maintain connections with a plurality of devices in the local device network. The devices may include what are commonly referred to as "Internet of things" (IoT) devices. The devices may be addressable, and/or eventually addressable (e.g., capable of receiving relayed messages sent over a computer network) over a computer network, and the devices may generate data (e.g., sensor data, device state data, etc.) and send the data to the computing hub for processing and/or storage. A computing hub may be configured to provide services to the devices that connect to the computing hub. In particular, the computing hub may host a storage service which may be used to store device-generated data received from the devices that connect to the computing hub. A local device network (e.g., an IoT network) may include multiple computing hubs wherein devices connect to the computing hubs and send device-generated data to the computing hubs, such that device-generated data may be distributed between the computing hubs.

In the past, obtaining device-generated data stored on computing hubs may have been difficult due to the distributed nature of the device-generated data on the computing hubs. For example, a user may have had to directly access individual computing hubs to obtain device-generated data stored on the computing hubs or query individual computing hubs using a web-based query interface. Also, in some cases, data policies may prevent sending of unprocessed device-generated data from computing hubs to a service provider environment ("cloud") for storage. Rather, the data policies may only allow for summarized or aggregated device-generated data to be sent to the service provider environment due to storage and cost constraints. As such, the unprocessed device-generated data may not be available in the service provider environment for uses such as deep learning, debugging, troubleshooting, and other uses.

The current technology provides a valuable technique for obtaining device-generated data from computing hubs by identifying which computing hubs contain the device-generated data and instructing each of the computing hubs to send the device-generated data to a service provider environment. The technology is an improvement over prior ways of obtaining device-generated data from computing hubs because a single distributed query can be used as opposed to accessing or querying individual computing hubs. More specifically, as described herein, program code functions may be distributed to a group of computing hubs so that the program code function may be available on the computing hubs to execute queries for retrieving device-generated data from a storage service hosted on the computing hubs, which is an improvement over prior ways of obtaining device-generated data from computing hubs. Moreover, the current technology allows a user to obtain unprocessed device-generated data from a group of computing hubs by specifying query parameters to retrieve specific device-generated data from the computing hubs. The query parameters may be used in a distributed query as described herein to obtain the unprocessed device-generated data from the computing hubs and transfer the device-generated data to a service provider environment where the device-generated data may be made available to the user.

To further describe the present technology, examples are now provided with reference to the figures. FIG. 1 is a block diagram that illustrates an example system 100 and method for querying computing hubs 110a-n for device-generated data stored on the computing hubs 110a-n using a program code function. As illustrated, the system 100 may include a service provider environment 102 that is in network communication with computing hubs 110a-n included in a local device network 108. The local device network 108 may include a plurality of devices 120 configured to connect to the computing hubs 110a-n, and the devices 120 may send device-generated data to the computing hubs 110a-n for storage by a storage service 116. For example, a device 120 may generate data (e.g., sensor data and/or device state data) and send the device-generated data to a computing hub 110a-n. The device-generated data may be sent via a named logical channel (e.g., a topic) using a publish-subscribe messaging system (e.g., a pub-sub system) or via an application programming interface (e.g., REST API) that provides the device-generated data to the storage service 116.

A computing hub 110a-n may host an instance (e.g., a software copy) of a storage service 116. The storage service 116 may provide storage for device-generated data via a service interface, which may include service specifications (e.g., query specifications) for storing and retrieving data from electronic storage 124 on a computing hub 110a-n. Illustratively, the storage service 116 may be a key-value storage service, time-series storage service, object storage service, relational storage service, flat file storage service, as well as any other suitable storage service. Device-generated data stored using the storage service 116 may include, but is not limited to, sensor data generated by a device sensor (e.g., temperature data, location data, image data, audio data, image data, global positioning system (GPS) data, etc.) and device state data indicating a current or past state of a device (e.g., "on", "off", "open", "closed", "moving", "stationary", etc.). In some cases, device-generated data may be processed (e.g., combined, transformed, classified, etc.) prior to storing the device-generated data.

The computing hubs 110a-n may host a function service 112 configured to manage execution of program code functions. The function service 112 may be a "serverless" compute service that executes program code functions in response to requests or events, and the function service 112 may automatically manage underlying compute resources used to execute the program code functions. In particular, the function service 112 may manage execution of a query function 114 configured to query the storage service 116 for device-generated data. A query function 114 may be configured to execute any type of data query, including read, write, update, and/or delete functions, as well as data operations, such as data aggregation, data sampling, data projection, generating data maps, computing data functions (e.g., means, max, min), generating data histograms, and the like. The query function 114 may be a program code function, which may comprise a "serverless" function. For example, a program code function may be a segment of program code that may be like a function, and the program code function may receive parameters, perform processing, make service requests, and provide return values. In one example, a software container may be used to provide an isolated environment on a computing hub 110a-n for a program code function to execute. The software container may contain the program code function (e.g., JAVA code, C# code, etc.) and any dependencies (e.g., library files) used to execute the program code function on a computing hub configuration (e.g., computing hub hardware and software). For example, operating system kernel functionality may be used to isolate computing resources and create separate namespaces in order to provide an isolated (containerized) user space for a program code function to execute. In doing so, the program code function may be contained to the isolated user space, allowing multiple containerized program code functions to utilize a single operating system kernel. Also, a runtime service may be loaded into the software container, and the runtime service may manage execution of the program code function and provide an interface between the operating system for the computing hub 110a-n and the program code function executing inside of the software container. The function service 112 may manage execution of program code functions by allocating computing resources for executing a program code function in response to execution requests, launching the program code function, and deallocating the computing resources utilized by the program code function. References made in this disclosure to a program code function, which includes a query function 114, may refer to a software container that contains a program code function (a segment of program code) and any dependencies used to execute the program code function.

In one example configuration, a query function 114 may be created to execute a data query using query parameters for device-generated data, and the query function 114 may be distributed to a group of computing hubs 110a-n which store the device-generated data specified by the query parameters. In some examples, in addition to executing a data query, a query function 114 may be configured to perform other actions, such as data processing operations (e.g., calculate a sum, average, median, etc.) and returning device-generated data to a storage location 118 in the service provider environment 102. In some cases, a query function may be 114 linked to other program code functions, creating a chain of program code functions for executing a chain of actions, such as, but not limited to: querying the storage service 116 for device-generated data, summarizing the device-generated data, and sending the summarized device-generated data to a storage location 118 in the service provider environment 102.

In one example, a user may create a query function 114 and send the query function 114 to a group of computing hubs 110a-n selected by the user. In other examples, as described later in FIGS. 2-3, a query function 114 may be generated using query parameters provided by a user. The query function 114 may be stored on a computing hub 110a-n, making the query function 114 available to execute the data query on the computing hub 110a-n. In particular, a query function 114 may be created for a data query for specific device-generated data and the query function 114 may be sent to the computing hubs 110a-n that contain the specific device-generated data. As an illustration, a first query function may be created to execute a data query for temperature data and the first query function may be sent to the computing hubs 110a-n that contain the temperature data. A second query function may be created to execute a data query for atmospheric particulate data and the second query function may be sent to the computing hubs 110a-n that contain the atmospheric particulate data. Because each individual computing hub 110a-n may store multiple types of device-generated data, the computing hubs 110a-n may contain both the temperature data and the atmospheric particulate data, and therefore the computing hubs 110a-n may be sent both the first query function and the second query function.

In a further example, a named logical channel (e.g., a topic) used to publish messages to subscribed computing hubs may be created (via a message broker service 104) and the computing hubs 110a-n may be subscribed to the named logical channel. Thereafter, a distributed query may be performed by publishing a message to the named logical channel or topic that includes instructions to execute the query function 114 on the computing hubs 110a-n, and the message broker service 104 may distribute the message to the computing hubs 110a-n subscribed to the named logical channel. In response to receiving the message via the named logical channel, the computing hubs 110a-n may instruct the function service 112 to execute the query function 114 and the computing hubs 110a-n may send the device-generated data returned by the query function 114 to a storage location 118 in the computing service environment 102.

In another example, a distributed query service 122 hosted in the service provider environment 102 may provide a user with a query interface to the storage services 116 on the computing hubs 110a-n, allowing the user to initiate a distributed query for device-generated data stored on the computing hubs 110a-n. For example, in response to a user request for device-generated data, the distributed query service 122 may be configured to identify which computing hubs 110a-n contain the device-generated data and send a message to the computing hubs 110a-n to execute the query function 114. In another example, as described in more detail later, computing hub profiles 106 may include information about which computing hubs 110a-n have the device-generated data and the computing hub profiles 106 may be referenced to identify the computing hubs 110a-n that contain the device-generated data. In response to receiving the message, each computing hub 110a-n may instruct the function service 112 to execute the query function 114 specified in the message, and the device-generated data returned by the query function 114 may be sent to a storage location 118 in the service provider environment 102, allowing a user (via a client) to access the storage location 118 and utilize the device-generated data.

As an illustration, devices 120 may generate temperature data and send the temperature data to the computing hubs 110a-n to be stored using the storage service 116 hosted on the computing hubs 110a-n. A user may create a query function 114 to query the storage service 116 on a computing hub 110a-n for temperature data using temperature threshold and time parameters, and the user, via the distributed query service 122, may distribute the query function 114 to a group of computing hubs 110a-n that have the temperature data stored on the computing hubs 110a-n. The user may create a named logical channel (e.g., "temp query") and subscribe the computing hubs 110a-n to the named logical channel. Thereafter, the user can then perform a distributed query for the temperature data by publishing a message to the named logical channel that includes instructions to execute the query function 114. Each computing hub 110a-n may execute the query function 114 and the temperature data returned by the query function 114 may be sent to a storage location 118 in the service provider environment 102, allowing the user to access the storage location 118 and utilize the temperature data. In one example, device-generated data sent by the computing hubs 110a-n to the service provider environment 102 may be collected and aggregated, and an aggregated data set may be provided to a user. For example, temperature data received from computing hubs 110a-n may be aggregated and summarized temperatures for each computing hub 110a-n may be provided to a user.

The services 104/112/116/122 described in FIG. 1 may communicate using request-response interfaces which may include, but are not limited to, inter-process communication interfaces, application programming interfaces (APIs), procedure call interfaces, and/or other types of request-response interfaces. The devices 120 may communicate with the computing hubs 110a-n using any suitable protocol including, MQTT (Message Queue Telemetry Transport), CoAP (Constrained Application Protocol), HTTP (Hypertext Transfer Protocol), and HTTPS (HTTP secure).

The service provider environment 102 may include a number of computing devices that are arranged, for example, in one or more server banks or computer banks or other arrangements. The computing devices may support a computing environment using hypervisors, virtual machine monitors (VMMs) and other virtualization software. The term "storage" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. Storage system components may include storage systems such as a SAN (Storage Area Network), cloud storage network, volatile or non-volatile RAM, optical media, or hard-drive type media. The storage may be representative of a plurality of data stores as can be appreciated.

API calls, procedure calls or other network commands that may be made in relation to the services included in the service provider environment 102 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A network used by the system 100 may include any useful computing network, including an intranet, the Internet, a local area network, a wide area network, a wireless data network, or any other such network or combination thereof. Components utilized for such a network may depend at least in part upon the type of network and/or environment selected. Communication over the network may be enabled by wired or wireless connections and combinations thereof.

Figure 2:
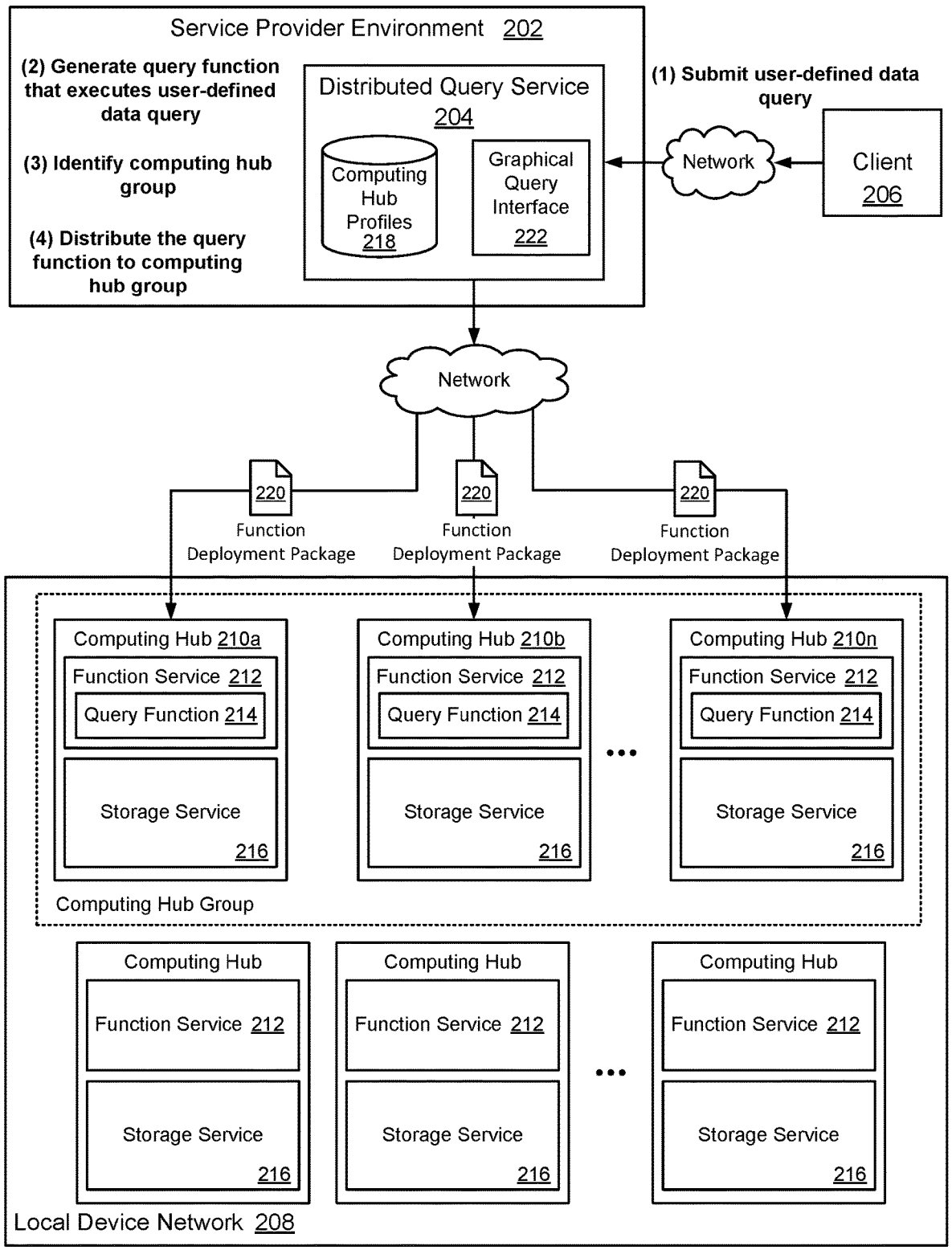
FIG. 2 is a block diagram illustrating an example of a system and method for generating a query function used for distributed querying of computing hubs.

FIG. 2 is a block diagram illustrating a system 200 and method for generating a query function 214 used for distributed querying of computing hubs 210a-n. The system 200 may include a service provider environment 202 that is in network communication with a local service network 208 that includes a plurality of computing hubs 210a-n, as described earlier. The service provider environment 202 may include a distributed query service 204 configured to generate a query function 214 using query parameters provided by the user and distribute the query function 214 to computing hubs 210a-n which store device-generated data specified in the user-provided query parameters.

In one example, a user (via a client 206) may provide query parameters for querying a storage service 216 on a computing hub 210a-n to the distributed query service 204 hosted in the service provider environment 202, and the distributed query service 204 may use the query parameters to generate a query function 214, which may be a program code function, which when executed on a computing hub 210a-n queries the storage service 216 for device-generated data specified by the query parameters. As an illustration, a user may submit a query that includes query parameters for temperature data for the last 30 days between 10:00 AM and 3:00 PM, and the distributed query service 204 may generate a query function 214, that when executed by a function service 212 on a computing hub 210a-n, queries the storage service 216 on the computing hub 210a-n for the temperature data that meets the query parameters.

The distributed query service 204, in one example, may be configured to provide a user with a graphical query interface 222 for constructing a user-defined query for device-generated data that may be stored on a group of computing hubs 210a-n. The graphical query interface 222 may include graphical components used to provide information for device-generated data stored on computing hubs 210a-n and graphical components that allow a user (via a client 206) to enter query parameters for querying a storage service 216 hosted on a computing hub 210a-n for device-generated data. The query parameters entered into the graphical components may be used by the distributed query service 204 to generate a query function 214 that, when executed on a computing hub 210a-n, queries the storage service 216 on the computing hub 210a-n for device-generated data using the query parameters.

Information for computing hubs 210a-n, including what types of device-generated data may be stored on the computing hubs 210a-n, may be maintained in the service provider environment 202 using computing hub profiles 218, which in one example may include computing hub representations. Illustratively, information included in a computing hub profile 218 may include: hardware and software specifications for a computing hub 210a-n, computing hub states, computing hub configurations, devices that may connect to the computing hub 210a-n, program code functions (including query functions 214) located on the computing hub 210a-n, device-generated data contained on the computing hub 210a-n, as well as metadata for the device-generated data. A computing hub representation (not shown) may be an electronic representation (e.g., a data object) of a computing hub 210a-n that may be managed by a device shadowing service (not shown) hosted in the service provider environment 202. The computing hub representation may be referenced via a computer network and updated by the computing hub 210a-n to indicate a state of the computing hub 210a-n. In particular, the computing hub representation may include information for types of device-generated data contained on the computing hub 210a-n. As such, the computing hub representation can be referenced to determine what type of device-generated data may be stored on the computing hub 210a-n.

In one example, an index (not shown) of device-generated data stored on computing hubs 210a-n may be generated and the index may be used to determine which computing hubs 210a-n contain device-generated data specified by a data query. The index may include metadata for the device-generated data, and the metadata may be used to identify the computing hubs 210a-n that contain the device-generated data which meets conditions specified in the data query, thereby reducing the number of computing hubs 210a-n that may need to be queried for the device-generated data. As an example, the index may include an index for time-stamped temperature data and the index may be referenced to determine which computing hubs 210a-n contain temperature data that falls within a time-range specified in a data query. In one example, an index for device-generated data stored on computing hubs 210a-n may be constructed using a distributed query as described herein, where individual computing hubs 210a-n may be instructed to query the storage service 216 hosted on the computing hubs 210a-n for metadata and send the metadata to the service provider environment 202, and the metadata may be used to construct the index. As an example, computing hubs 210a-n may host a query function 214 configured to execute a query for metadata and the computing hubs 210a-n may be instructed to execute the query functions 214 and send the metadata to the distributed query service 204, which may construct the index using the metadata received from the computing hubs 210a-n. An index of device-generated data contained on a computing hub 210a-n may be stored in a computing hub profile 218 or computing hub representation, or alternatively, a comprehensive index of device-generated data contained on computing hubs 210a-n included in a local device network 208 may be maintained in a service provider environment 202.

In one example, the distributed query service 204 may be configured to obtain information about the computing hubs 210a-n from computing hub profiles 218 (or computing hub representations) and provide a user with information about what types of device-generated data may be stored on the computing hubs 210a-n. The types of device-generated data contained on the computing hubs 210a-n may vary and may be based on the devices that connect to the computing hubs 210a-n. For example, devices that generate temperature data may be configured to connect to a first computing hub 210a, and devices that generate air quality data may be configured to connect to a second computing hub 210b. Thus, when constructing a query for device-generated data, a user may be able to determine which computing hubs 210a-n contain the device-generated data by way of the information obtained from the computing hub profiles 218. The user may be able to filter the computing hub information to identify computing hubs 210*a-n* that contain a type of device-generated data and the user can select the computing hubs 210*a-n* to receive a query function 214 configured by the user to query the storage service 216 for the device-generated data. As an example, a user may identify computing hubs 210*a-n* that contain precipitation data by applying a filter against information for computing hubs 210*a-n*, and the user can instruct the distributed query service 204 to send a query function 214 configured to obtain the precipitation data to the computing hubs 210*a-n* that contain the precipitation data.

As indicated above, the distributed query service 204 may be used to distribute a query function 214 to computing hubs 210*a-n* that have been identified as containing device-generated data, of which the query function 214 is configured to obtain. In one example, a user may specify which of the user's computing hubs 210*a-n* containing device-generated data to send a query function 214. In another example, the distributed query service 204 may be configured to identify which computing hubs 210*a-n* contain device-generated data specified by query parameters of a query function 214. For example, the distributed query service 204 may reference computing hub profiles 218 to identify computing hubs 210*a-n* that contain device-generated data specified by the query parameters of a query function 214.

As illustrated, a query function 214 may be distributed to a group of computing hubs 210*a-n* by way of a function deployment package 220 (e.g., a file that contains a program code function and any dependencies) used to deploy program code functions to computing hubs 210*a-n*. The distributed query service 204 may be configured to create a function deployment package 220 that contains a query function 214 and query function dependencies. The distributed query service 204 may send the function deployment package 220 (i.e., instances of the function deployment package 220) to the computing hubs 210*a-n* that have been designated to receive the query function 214. In response to receiving the function deployment package 220, a computing hub 210*a-n* may be configured to unpack the function deployment package 220 (e.g., decompressing, installing, inspecting, etc.) and register the query function 214 with the function service 212, enabling the function service 212 to identify and execute the query function 214.

After distributing a query function 214 to a group of computing hubs 210*a-n*, a user may initiate a distributed query for device-generated data by sending instructions to the computing hubs 210*a-n* to execute the query function 214. In one example, the computing hubs 210*a-n* may be subscribed to a named logical channel used to receive a message at the computing hubs 210*a-n* to execute the query function 214. For example, a named logical channel may be created and the computing hubs 210*a-n* may be subscribed to the named logical channel. Thereafter, a distributed query may be initiated, via a client 206 or the distributed query service 204, by publishing a message to the named logical channel, and the message may be distributed to the computing hubs 210*a-n* via a message broker (shown in FIG. 1). In another example, the distributed query service 204 may be configured to identify which computing hubs 210*a-n* contain device-generated data that corresponds to a user request to execute a distributed query, and the distributed query service 204 may send instructions to the identified computing hubs 210*a-n* to execute the query function 214. For example, in response to a distributed query request for device-generated data, the distributed query service 204 may reference computing hub profiles 218 to determine which computing hubs 210*a-n* contain the device-generated data requested by a user and send instructions to the computing hubs 210*a-n* to execute the query function 214.

In addition to identifying which computing hubs 210*a-n* have device-generated data requested by a user, in one example, the distributed query service 204 may determine the active state of the computing hubs 210*a-n* in order to determine whether a computing hub 210*a-n* is able to respond to an instruction to execute the query function 214, thereby avoiding sending query instructions to inactive computing hubs 210*a-n*.

Figure 3:
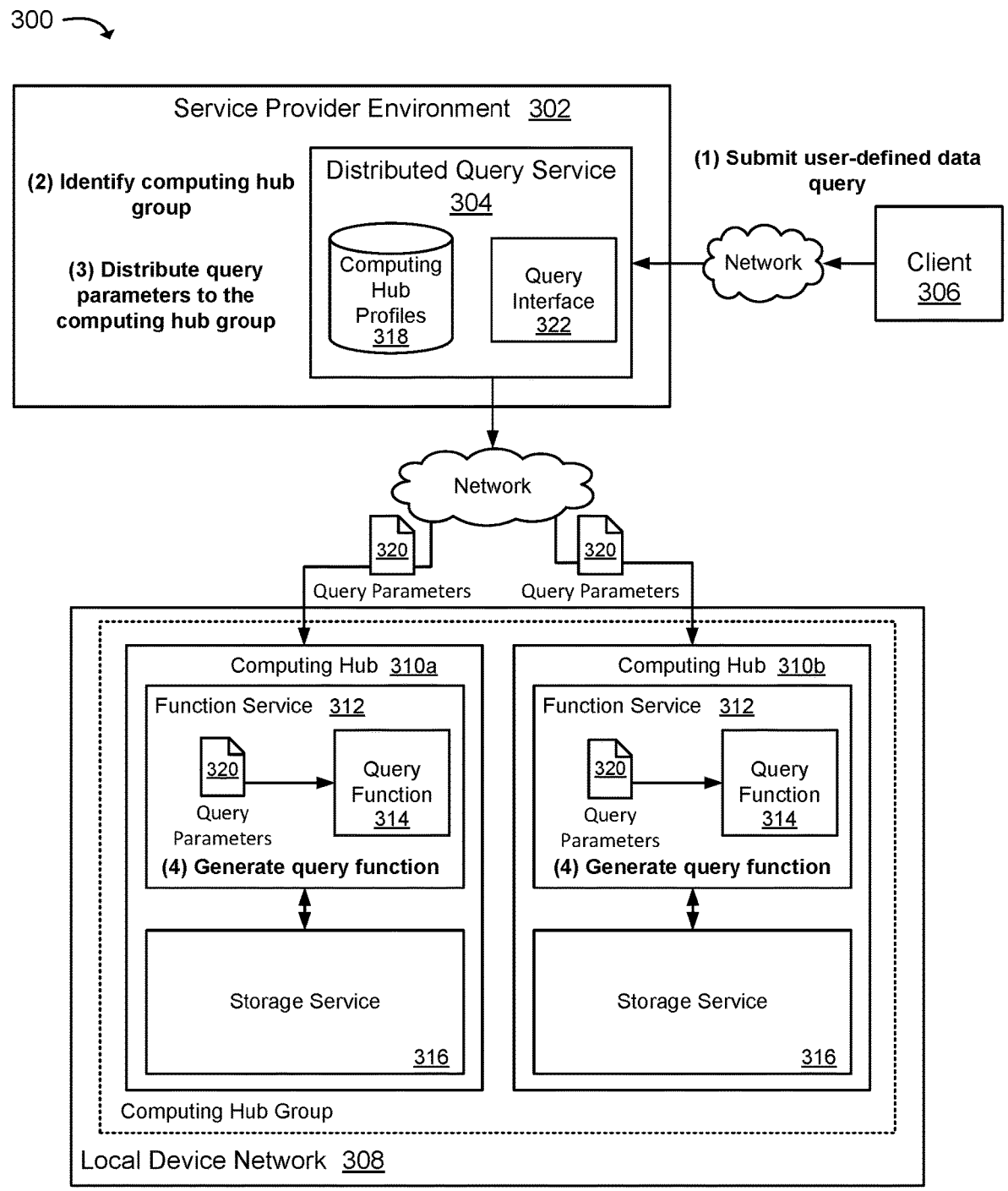
FIG. 3 is a block diagram that illustrates an example of a system and method for generating a program code function on a computing hub using a user-defined data query.

FIG. 3 is a block diagram that illustrates an example system 300 and method for generating a query function 314 from a user-defined data query on a computing hub 310*a-b* in order to optimize the query function 314 for execution on the computing hub 310*a-b*. Computing hubs 310*a-b* included in a local device network 308 may be implemented using a variety of different computing resources. For example, a service provider may provide computing hub software to users who may install the computing hub software on computing devices having various computing hardware and/or software. Also, computing hub manufacturers may produce a number of different computing hub devices using various computing hardware and/or software. As such, because computing resources may vary between computing hubs 310*a-b*, a query function 314 may be generated to execute on the specific computing resources of a particular computing hub 310*a-b*. For instance, a query function 314 may be constructed for execution on a computing hub configuration comprising computing hub hardware and/or software. As described earlier, the query function 314, when loaded on a computing hub 310*a-b*, may include a software container that provides an isolated environment for a program code function to execute on the computing hub 310*a-b*. The software container may be constructed to include program code function dependencies (e.g., library files) that are specific to the hardware and/or software of a particular computing hub 310*a-b*.

Moreover, device-generated data that is stored across multiple computing hubs 310*a-b* may be stored using different data store formats (e.g., key-value, time-series, object, relational, etc.) and/or different data labels (e.g., key-value names, object names, property names, column names, field names, etc.). For example, temperature data may be stored on a first computing hub 310*a* using a key-value data store, whereas temperature data stored on a second computing hub 310*b* may be stored using a time-series data store. Also, a data label (e.g., "temp_data") for the temperature data on the first computing hub 310*a* may be different than a data label (e.g., "temperature data") for the temperature data on the second computing hub 310*b*. As such, a query function 314 may be generated to execute a data query that corresponds to a data store format and/or data labels used by a storage service 316 on a computing hub 310*a-b*.

As illustrated, a distributed query service 304 hosted in a service provider environment 302 may be configured to distribute a user-defined data query to computing hubs 310*a-b* that contain device-generated data specified in the data query. In one example, using a client device 306, a user may submit a user-defined data query to the distributed query service 304. In response to receiving the user-defined data query, the distributed query service 304 may be configured to identify which computing hubs 310*a-b* included in a local device network 308 contain the device-generated data specified in the user-defined data query. For example, the distributed query service 304 may analyze the user-defined data query to identify the device-generated data specified in the user-defined data query and reference computing hub profiles 318 (or computing hub representations described earlier) to identify which computing hubs 310*a-b* contain the device-generated data. In cases where the data labels of the device-generated data may vary between computing hubs 310*a-b*, the data labels may be linked (e.g., using a table or database maintained in the service provider environment 302) to allow the distributed query service 304 to identify the computing hubs 310*a-b* as having the device-generated data specified in a user-submitted data query. For example, as described later in association with FIG. 5, a classification technique, such as semantic classification may be used to link data labels for device-generated data across computing hubs 310*a-b*.

After identifying the computing hubs 310*a-b* that contain the device-generated data specified in the user-defined data query, the distributed query service 304 may send the query parameters 320 of the user-defined data query to the computing hubs 310*a-b*. For example, the distributed query service 304 may send a message to the computing hubs 310*a-b* wherein the payload of the message includes the query parameters 320 of the user-defined data query. As an illustration, a user may submit a user-defined data query to the distributed query service 304 (e.g., via a query interface 322) and the distributed query service 304 may generate a message that includes the query parameters 320 of the user-defined data query in the payload of the message, and the message may be published to a topic of a pub-sub system and sent to the computing hubs 310*a-b* subscribed to the topic.

In response to receiving the query parameters 320, a computing hub 310*a-b* may provide the query parameters 320 to a function service 312 configured to generate a query function 314 to execute the query parameters 320 on the computing hub 310*a-b* using the computing resources of the computing hub 310*a-b* and/or data labels recognized by the storage service 316 on the computing hub 310*a-n*. The resulting query function 314 may be registered with the function service 312 so that the query function 314 may be available to be executed on the computing hub 310*a-b* as part of a distributed query for the device-generated data.

In one example, a program code function (not shown) may be used to optimize a query function 314 for a computing hub 310*a-b*. For example, the program code function may be configured to generate a query function 314 to execute query parameters 320 using the computing resources (e.g., processor, memory, software, etc.) of a computing hub 310*a-b*. For example, query parameters 320 received by a computing hub 310*a-b* may be provided to the function service 312 hosted on the computing hub 310*a-b*, and the function service 312 may execute a program code function configured to generate an "optimized" query function 314, such that the query function 314 may be configured for execution on the specific or particular computing resources (e.g., processor, memory, software, etc.) of a computing hub 310*a-b*, and/or the query function 314 may be configured to query the storage service 316 (e.g., storage service version) hosted on a computing hub 310*a-b*. The program code function may be configured to analyze the query parameters 320 and correlate the query parameters 320 to the query specifications of a storage service 316 (e.g., data store format, device-generated data label, etc.), and generate the query function 314 to query the storage service 316 using the query specifications. As described above, the query function 314 may then be registered with the function service 312, making the query function 314 available to be executed on the computing hub 310*a-b* as part of a distributed query for the device-generated data.

Figure 4:
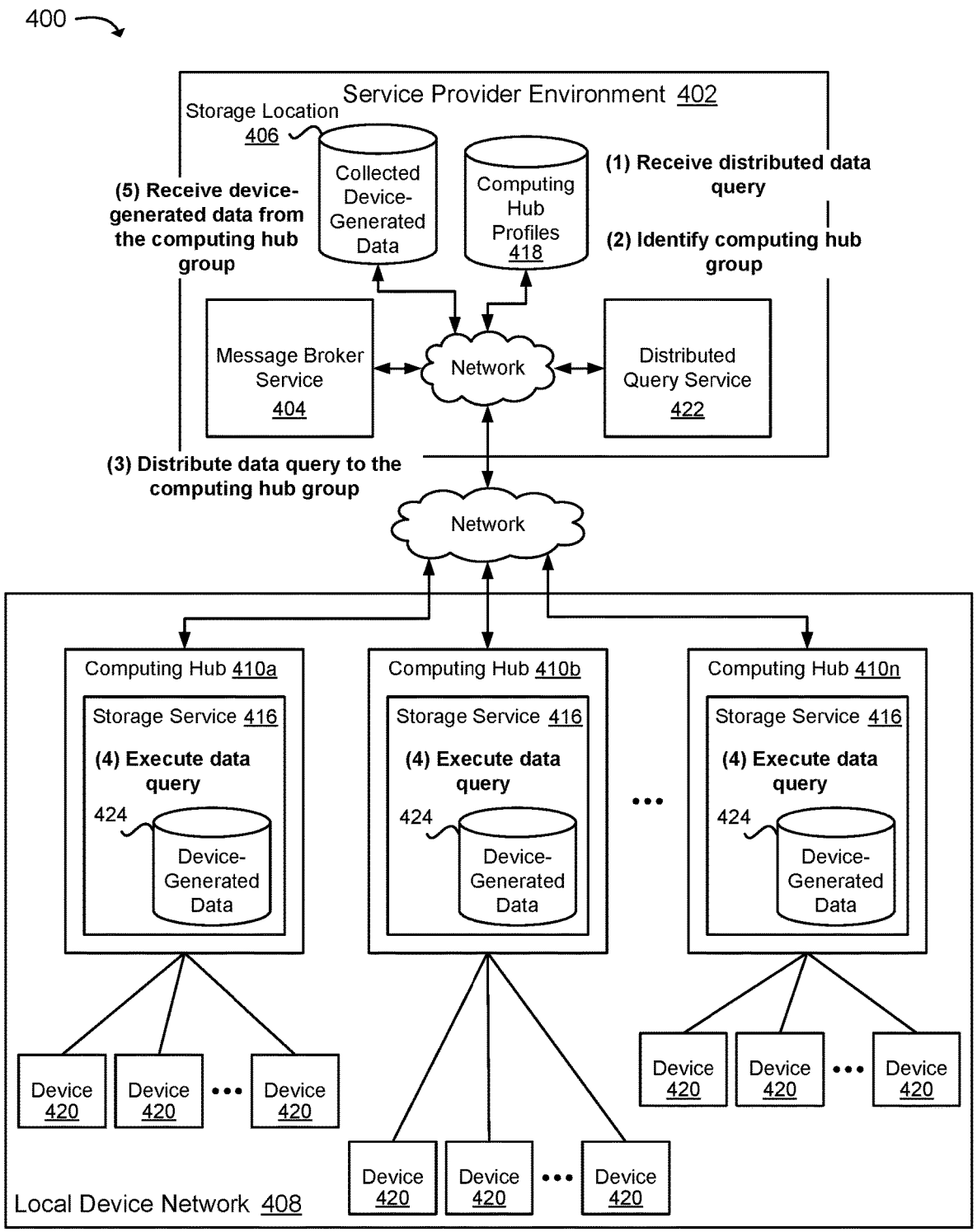
FIG. 4 is a block diagram illustrating an example system and method for a distributed query that sends query parameters to a group of computing hubs.

Moving now to FIG. 4, a block diagram illustrates an example system 400 and method for a distributed query that sends messages containing query parameters to a group of computing hubs 410*a-n* included in a local device network 408, which in response to receiving the message then execute a data query using the query parameters. In one example configuration, a distributed query may be initiated by publishing a message containing query parameters to a named logical channel of a pub-sub system used to distribute the query parameters to the computing hubs 410*a-n* that are subscribed to the named logical channel. A message broker service 404 may be configured to identify the computing hubs 410*a-n* that are subscribed to the named logical channel and send the message to the computing hubs 410*a-n*.

Upon receiving the message, a computing hub 410*a-n* may provide the query parameters contained in the message to a storage service 416 hosted on the computing hub 410*a-n*, and the storage service 416 may execute a data query using the query parameters. The storage service 416, as described earlier, may provide storage 424 for device-generated data via a service interface, which may include service specifications (e.g., query specifications) for storing and retrieving data from storage 424 on a computing hub 410*a-n*. The storage service 416 may include a key-value storage service and/or a time-series storage service, as well as any other suitable storage service. The computing hub 410*a-n* may be configured to send device-generated data returned by the data query to a storage location 406 (e.g., an object storage service) in the service provider environment 402 to be stored with other device-generated data received from the other computing hubs 410*a-n* included in the distributed query for the device-generated data. The device-generated data may be collected in the storage location 406, and in some examples, the device-generated data may be aggregated.

As an illustration, computing hubs 410*a-n* that contain temperature data generated by devices 420 may be subscribed to a named logical channel "temp_topic", and a distributed query for the temperature data may be performed by publishing a message that includes query parameters for temperature data to the named logical channel. As a non-limiting example, the query parameters may select time-series temperature data from a time-series storage service for the past 30 days having an average temperature above 75 degree Fahrenheit. A computing hub 410*a-n* subscribed to the named logical channel "temp_topic" may provide the query parameters to a time-series storage service hosted on the computing hub 410*a-n* and the time-series storage service may execute a data query using the query parameters to obtain the temperature data that meets the query parameters. The computing hub 410*a-n* may send the temperature data returned by the time-series storage service to the a storage location 406 in the service provider environment 402 to be collected and/or aggregated with other temperature data sent by other computing hubs 410*a-n* subscribed to the named logical channel "temp_topic" (i.e., which also received the message containing the query parameters).

In another example configuration, a distributed query service 422 may be used to identify a group of computing hubs 410*a-n* that contain device-generated data and a message containing query parameters for a distributed query may be distributed to the computing hubs 410*a-n*. In one example, in response to a distributed query request for device-generated data, the distributed query service 422 may reference computing hub profiles 418 (or computing hub representations) to identify which computing hubs 410*a-n* contain the device-generated data (including which computing hubs 410a-n are active), and the distributed query service 422 may cause a message that includes query parameters for the distributed query to be sent to the computing hubs 410a-n (e.g., via publishing the message to a topic or routing copies of the message to individual computing hubs 410a-n) that contain the device-generated data. In another example, after identifying the computing hubs 410a-n that contain the device-generated data, the distributed query service 422 may send a request to the message broker service 404 to create a named logical channel and a request to the computing hubs 410a-n to subscribe to the newly created named logical channel. Thereafter, the distributed query service 422 may publish a message containing the query parameters for the distributed query to the named logical channel, and the message broker service 404 may distribute the message to the computing hubs 410a-n. In response to receiving the message, the computing hubs 410a-n may provide the query parameters included in the message to the storage service 416 hosted on the computing hubs 410a-n and the storage service 416 may execute a data query using the query parameters. The computing hubs 410a-n may then send the device-generated data obtained from the storage service 416 to a storage location 406 in the service provider environment 402, allowing a user to access the device-generated data obtained from the computing hubs 410a-n via the service provider environment 402. As will be appreciated, while the figures described above illustrate examples of system environments that may implement the techniques above, many other similar or different environments are possible. The example environments discussed and illustrated above are merely representative and not limiting.

Figure 5:
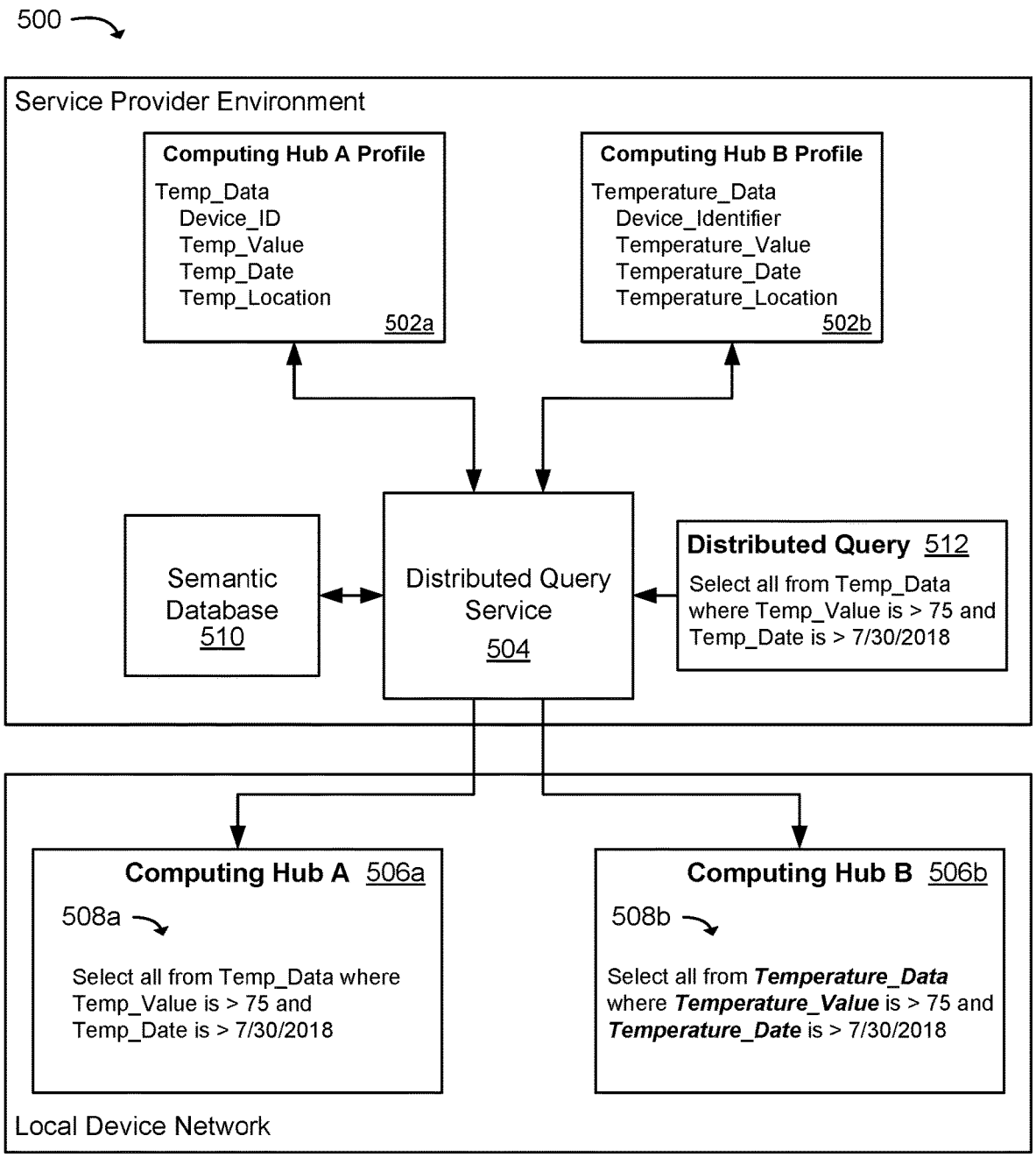
FIG. 5 is a block diagram that illustrates an example method for generating a data query to retrieve data elements used by a data store hosted on a computing hub.

FIG. 5 is a block diagram that illustrates an example method 500 for generating a data query 508a-b to reference data elements used by a data store hosted on a computing hub 506a-b. In some cases, data stores used to store device-generated data on computing hubs may differ from one computing hub to another computing hub. For example, a naming convention used to name data elements in a data store (e.g., key-value pairs, objects, tables, columns, fields, or other elements of a data store structure) on a first computing hub may be different from a naming convention used to name corresponding data elements in a data store on a second computing hub. As an illustration, temperature data generated by devices and stored on computing hubs 506a-b may be stored in a table named "Temp_Data" on a first computing hub 506a, and stored in a table named "Temperature_Data" on a second computing hub 506b. Because the data stores on the computing hubs 506a-b may use different naming conventions, a distributed query 512 may be modified to correspond to a naming convention used by a particular computing hub 506a-b.

As illustrated in FIG. 5, a distributed query service 504 may be configured to modify a distributed query 512 to comply with a naming convention used by a data store on a computing hub 506a-b. In one example, the distributed query service 504 may analyze query parameters of a distributed query 512 to identify data elements in the query parameters, and correlate the data elements to a naming convention used by a data store on a computing hub 506a-b. Correlation of the data elements may be performed using computing hub profiles 502a-b that contain information for device-generated data stored on the computing hubs 506a-b. The distributed query service 504 may reference a computing hub profile 502a-b to determine a naming convention for data elements used by a data store on the computing hub 506a-b and to correlate the data elements identified in the query parameters of the distributed query 512 to the naming convention used by the data store on the computing hub 506a-b. In one example, matching the data elements to the naming convention may be performed using a classification technique, such as semantic classification, which uses a semantic database 510 to associate a data element specified in the distributed query 512 with a naming convention used by a data store on a computing hub 506a-b. In another example, a tagging technique may be used to match data elements between data stores and a distributed query 512 by assigning a tag (e.g., "temp_data") to data elements that use different naming conventions (e.g., "temperature_data).

The distributed query service 504 may be configured to update a distributed query 512 to comply with a naming convention used by a data store on a computing hub 506a-b. In one example, the distributed query service 504 may generate a data query 508a-b to use a naming convention used by a computing hub 506a-b and send the data query 508a-b in a message to the computing hub for execution by a storage service as described earlier in relation to FIG. 4. In another example, the distributed query service 504 may generate a query function to execute a data query 508a-b that complies with a naming convention used by a computing hub 506a-b, and the query function may be sent to the computing hub as described in earlier in relation to FIG. 1.

Also, in some examples, a distributed query 512 may be modified to comply with a data store type. For example, a data store used to store device-generated data on one computing hub 506a-b may be a different type of data store than that used to store device-generated data on another computing hub 506a-b. As an example, a key-value data store may be used on a first computing hub 506a-b to store temperature data, and a time-series data store may be used to store temperature data on a second computing hub 506a-b. The distributed query service 504 may be configured to modify a distributed query 512 to query a data store type used by a computing hub 506a-b using a computing hub profile 502a-b to correlate data elements identified in the distributed query 512 to data elements in the data store on the computing hub 506a-b.

Figure 6:
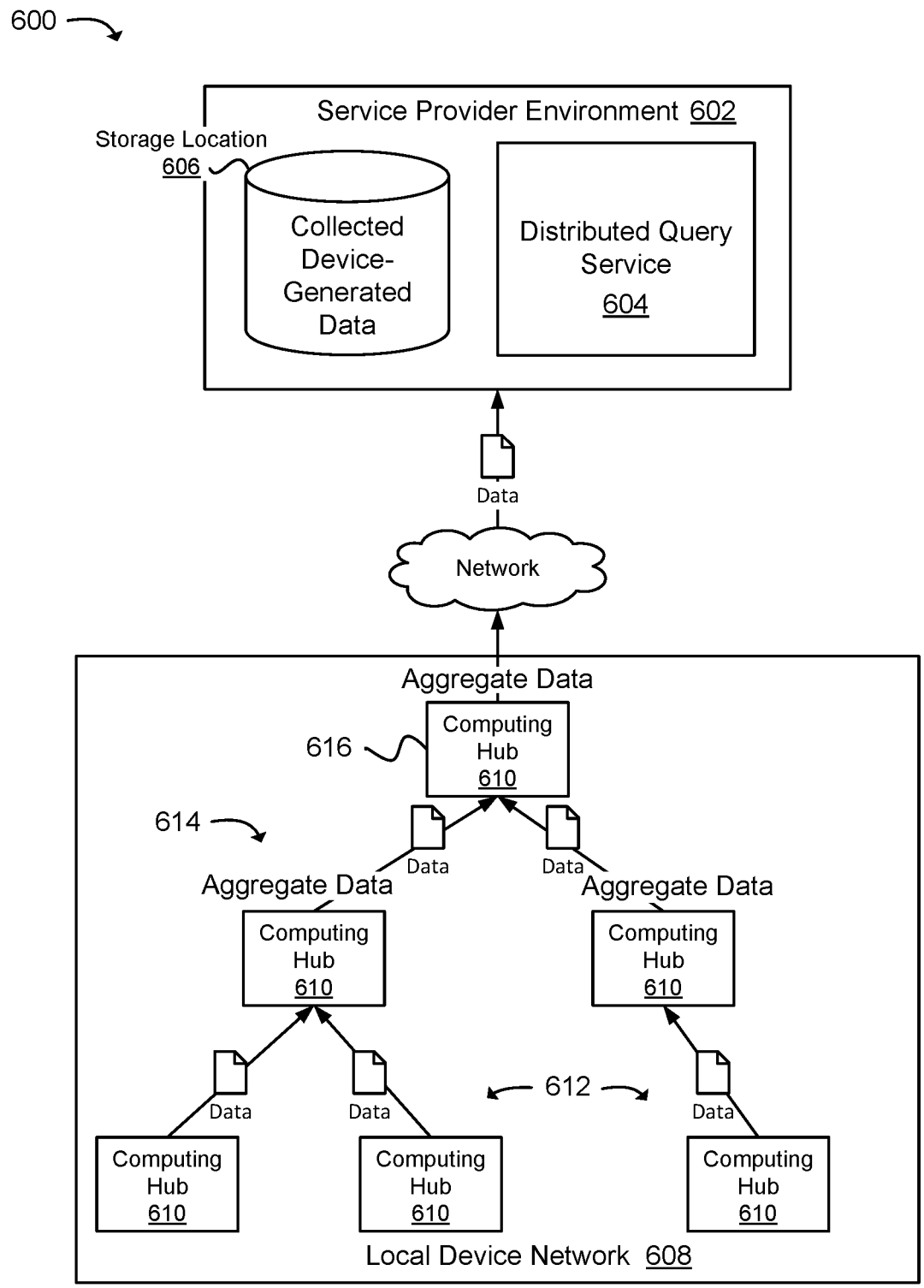
FIG. 6 is a block diagram illustrating an example system having computing hubs organized in a computing hub hierarchy configured to execute a distributed query for device-generated data and send the device-generated data to a service provider environment.

FIG. 6 is a block diagram illustrating an example system 600 having computing hubs 610 organized in a computing hub hierarchy configured to execute a distributed query for device-generated data and send the device-generated data to a service provider environment 602. The computing hubs 610 may be included a local device network 608 and the computing hubs 610 may be communicatively organized in a hierarchy, in which lower-level computing hubs 612 send device-generated data to upper-level computing hubs 614, and top-level computing hubs 616 send the device-generated data to a service provider environment 602.

In one example, the computing hubs 610 may be instructed to execute a distributed query for device-generated data as described earlier in association with FIGS. 1 and 4. After executing the distributed query for the device-generated data, a lower-level computing hub 612 may be configured to send the device-generated data to an upper-level computing hub 614 which may be configured to aggregate the device-generated data with device-generated data obtained from storage of the upper-level computing hub 614 and device-generated data received from other lower-level computing hubs 612. As such, device-generated data may be passed up the computing hub hierarchy and the device-generated data may be aggregated with additional device-generated data at each level of the computing hub hierarchy. A computing hub 616 located at the top level of the computing hub hierarch may send the aggregated device-generated data to a storage location 606 in the service provider environment 602.

In some examples, aggregation of device-generated data may be performed by designated computing hubs (e.g., a top-level computing hub 616, or computing hubs having sufficient computing resources to perform aggregation). For example, computing hubs 610 may pass unprocessed device-generated data up a computing hub hierarchy to a designated computing hub configured to aggregate the device-generated data. In other examples, computing hubs 610 may pass unprocessed device-generated data to a service provider environment 602 and the device-generated data may be aggregated by a distributed query service 604.

The distributed query service 604 hosted in the service provider environment 602 may be configured to perform additional aggregation of device-generated data received from computing hubs 610. For example, the distributed query service 604 may aggregate data received from multiple top-level computing hubs 616, as well as computing hubs that may not be included in a computing hub hierarchy. The distributed query service 604 may also be configured to perform additional processing of device-generated data, such as calculating averages, medians, modes, etc. and may provide analytical tools to users for analyzing the device-generated data. As will be appreciated, the example computing hub hierarchy illustrated in FIG. 6 is merely representative and not limiting, many other similar or different computing hub hierarchy configurations within the scope of this disclosure.

Figure 7:
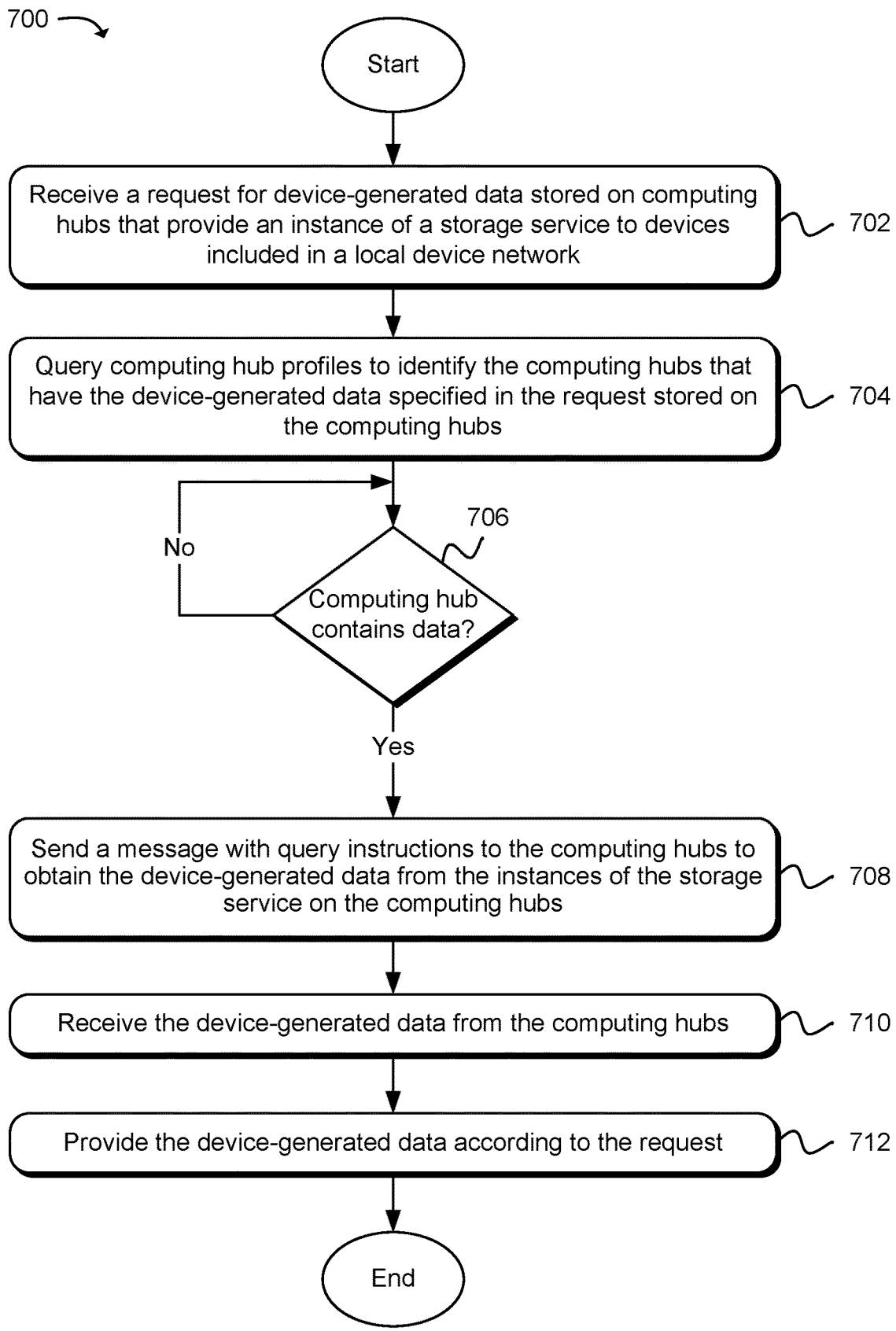
FIG. 7 is a flow diagram that illustrates an example method for executing a distributed query on a plurality of computing hubs for device-generated data.

FIG. 7 is a flow diagram that illustrates an example method 700 for executing a distributed query on a plurality of computing hubs for device-generated data. As in block 702, a request for device-generated data that is stored on computing hubs which provide instances of a storage service (e.g., instances of a key-value data service, time-series data service, etc.) to devices included in a local device network may be received at a distributed query service located in a service provider environment. For example, each computing hub may host an instance of a key-value data service, or an instance of a time-series data service, or instances of both a key-value data service and a time-series data service. The devices included in the local device network may send the device-generated data to the computing hubs to be stored by the instances of the storage service.

In one example, the request for the device-generated data may be a request to execute a program code function hosted on the computing hubs, which when executed, queries the instance of the storage service on a computing hub for the device generated data. In another example, the request for the device-generated data may include a user-defined query for retrieving the device-generated data from the computing hubs and the user-defined query may be distributed to the computing hubs for execution by the instances of the storage service hosted on the computing hubs.

As in block 704, computing hubs that maintain the device-generated data in the request stored on the computing hubs may be identified. In one example, identifying the computing hubs that have the device-generated data may include querying computing hub profiles to determine whether the computing hub profile indicates that a computing hub has the device-generated data, as specified in the request, stored on the computing hub. In another example, computing hub representations may be referenced to determine whether computing hubs have the device-generated data stored on the computing hubs. Also, in one example, identifying the computing hubs that have the device-generated data further includes referencing a computing hub profile or computing hub representation to determine an active state of a computing hub, which may be associated with the computing hub being able to provide the device-generated data. For example, a determination may be made whether a computing hub may be able to respond to a distributed query request prior to sending the request to the computing hub.

As in block 706, in the case that a computing hub is active and has the device-generated data stored on the computing hub, then as in block 708, a message may be sent to the computing hub, where the message may include query instructions for obtaining the device-generated data from the instance of the storage service on the computing hub, and the query instructions, when executed on the computing hub, retrieves the device-generated data from the instance of the storage service. In one example, the query instructions included in the message instruct the computing hubs to execute a program code function (e.g., a query function) on the computing hubs where the program code function may be configured to query the instance of the storage service on the computing hub for the device-generated data. Querying the storage service may include read, write, update and/or delete data functions, as well as data operations such as, data aggregation, data sampling, data projection, generating data histograms, and the like. In another example, the query instructions included in the message contain query parameters used by the instance of the storage service on the computing hubs to retrieve the device-generated data.

After querying the instance of the storage service on a computing hub, the computing hub may be configured to return the device-generated data to the distributed query service located in the service provider environment. For example, a program code function executed on the computing hub may be configured to return the device-generated data to the distributed query service. As in block 710, the device-generated data may be received from the computing hubs, and as in block 712, the device-generated data may be provided according the request for the device-generated data.

In one example, the distributed query service may be configured to aggregate the device-generated data received from the computing hubs to form an aggregated data set, and the aggregated data set may be provided to a user that requested the device-generated data. For example, device-generated data received from each computing hub may be combined into a single data set. Additional or alternative data processing may be performed on the device-generated data received from the computing hubs. For example, the device-generated data may be sorted, summarized, classified, analyzed, etc. In one example, one or more program code functions hosted in the service provider environment may be used to perform data processing on the device-generated data received from the computing hubs. As a non-limiting example, an aggregation function may be used to aggregate device-generated data, a classification function may be used to classify device-generated data, and an analysis function may be used to analyze the device-generated data. As an illustration, temperature data received from a plurality of computing hubs may be aggregated and the temperature data in the resulting aggregated data set may be classified according to geographical zones, and the temperature data may be analyzed to identify geographical zones that may be experiencing below average temperatures.

Figure 8:
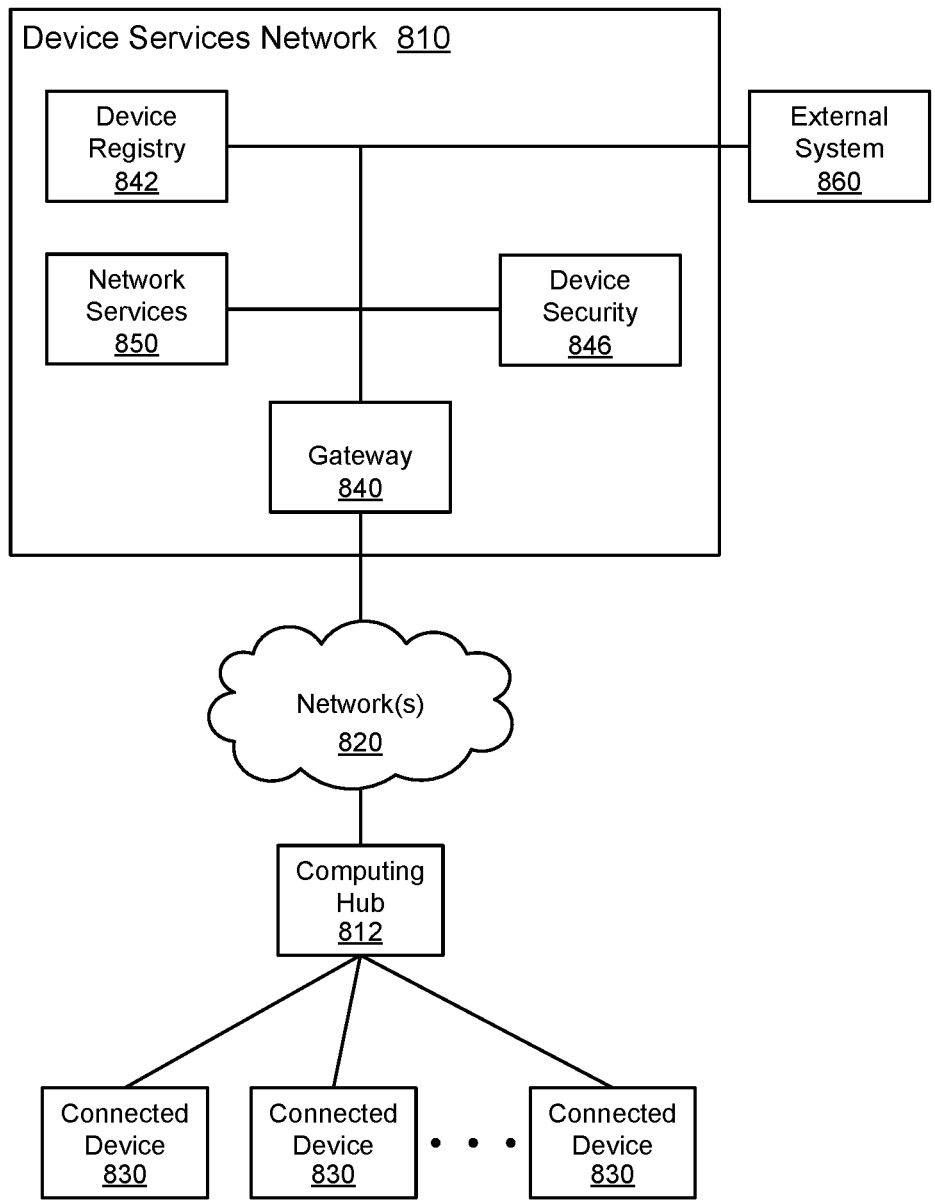
FIG. 8 is a block diagram illustrating an example computer networking architecture for a device services environment.

FIG. 8 is a block diagram illustrating an example device services environment 810 with which computing hubs 812, as described earlier, may communicate. The device services environment 810, which may be referred to as a device communication environment or system that comprises various resources made accessible via a gateway server 840 to computing hubs 812 and devices 830 that access the gateway server 840 via a network 820, such as a local wireless network that provides access to a wide area network. The computing hubs 812 and the devices 830 may access the device services environment 810 in order to access network and device services, such as data storage and computing processing features. Services operating in the device services environment 810 may communicate data and publication messages to the computing hubs 812 and/or the devices 830.

The device services environment 810 may comprise communicatively coupled component systems 840, 842, 846, and 850 that operate to provide services to the computing hubs 812 and the devices 830. The gateway server 840 may be configured to provide an interface between a computing hub 812 and the device services environment 810. The gateway server 840 receives requests from the computing hubs 812 and/or the devices 830 and forwards corresponding data and publication messages to the appropriate systems within the device services environment 810. Likewise, when systems within the device services environment 810 attempt to communicate data instructions to the computing hubs 812 and/or the devices 830, the gateway server 840 routes those requests to the correct device 830.

The gateway server 840 may be adapted to communicate with varied computing hubs 812 and devices 830 using various different computing and communication capabilities. For example, the gateway server 840 may be adapted to communicate using either TCP (Transmission Control Protocol) or UDP (User Datagram Protocol) protocols. Likewise, the gateway server 840 may be programmed to receive and communicate with computing hubs 812 and/or devices 830 using any suitable protocol including, for example, MQTT (Message Queue Telemetry Transport), CoAP (Constrained Application Protocol), HTTP (Hypertext Transfer Protocol), and HTTPS (HTTP secure). The gateway server 840 may be programmed to convert the data and instructions or publication messages received from the computing hubs 812 and/or the devices 830 into a format that may be used by other server systems comprised in the device services environment 810. In one example, the gateway server 840 may be adapted to convert a publication message received using the HTTPS protocol into a JSON (JavaScript Object Notation) formatted publication message that is suitable for communication to other servers within the device services environment 810.

The gateway server 840 may store, or may control the storing, of information regarding the computing hubs 812 and the devices 830 that have formed a connection to the particular gateway server 840 and for which the particular gateway server 840 may be generally relied upon for communications with the computing hubs 812 and the devices 830. In one example, the gateway server 840 may have stored thereon information specifying a particular computing hub 812 or device 830, such as an identifier. For each connection established from a particular computing hub 812 or device 830, the gateway server 840 may also maintain information identifying the connection. For example, a connection identifier may be generated and stored for each connection established with a particular computing hub 812 or device 830. Information relating to the particular connection may also be stored. For example, information identifying the particular socket of the gateway server 840 on which the connection was established, as well as information identifying the particular protocol used by a computing hub 812 or device 830 on the connection may be stored by the gateway server 840. Information such as the socket and protocol may be used in order to facilitate further communications via the particular connection.

In one example, the gateway server 840 may communicate via any suitable networking technology with a device registry server 842. The device registry server 842 may be adapted to track the attributes and capabilities of each computing hub 812 and/or device 830. In an example, the device registry server 842 may be provisioned with information specifying the attributes of a computing hub 812 and the devices 830 that connect to the computing hub 812. The device registry server 842 may comprise data specifying rules or logic (e.g., automation rules) for handling various requests that may be received from the computing hubs 812 and/or devices 830. The device registry server 842 may be programmed to convert specialized functions or commands received in particular communication protocols such as, for example HTTPS, MQTT, CoAP, into functions or commands using particular protocols that are understood by other of the servers in the device services environment 810. In one example, the device registry server 842 may be provisioned with information specifying that upon receipt of a particular request from a particular computing hub 812 or device 830, a request should be made to store the payload data of the request in a particular network service server 850. The device registry server 842 may be similarly programmed to receive requests from servers 842, 850 and convert those requests into commands and protocols understood by the computing hubs 812 and devices 830.

The device security server 846 maintains security-related information for the computing hubs 812 and devices 830 that connect to the device services environment 810. In one example, the device security server 846 may be programmed to process requests to register computing hubs 812 and devices 830 with the device services environment 810. For example, entities such as computing hub and device manufacturers, may forward requests to register computing hubs 812 and/or devices 830 with the device services environment 810. The device security server 846 receives registration requests and assigns unique identifiers to computing hubs 812 and devices 830 which use the identifiers on subsequent requests to access the device services environment 810. The device security server 846 stores, for each registered computing hub 812 or device 830, authentication information that may be provided during the registration process. For example, a request to register a computing hub 812 or device 830 may comprise information identifying the computing hub 812 or device 830 such as a serial number and information for use in authenticating the computing hub 812 or device 830. In one example, the information may comprise a digital certificate and may comprise a public key of a public key-private key pair. The information may be stored in relation to the assigned identifier for the particular computing hub 812 or device 830. When the computing hub 812 or device 830 subsequently attempts to access the device services environment 810, the request may be routed to the device security server 846 for evaluation. The device security server 846 determines whether authentication information provided in the request is consistent with the authentication information stored in relation to the identifier and provided during the registration process.

The device security server 846 may be further programmed to process request to associate particular entities (individuals or organizations) with particular computing hubs 812 and/or devices 830. The device security server 846 may be adapted to receive requests to register entities, which may be, for example, individuals, users, accounts, and/or organizations, as authorized to control or communicate with a particular computing hub 812 and/or device 830. In one example, a request may be received from an individual or organization that may have purchased a computing hub 812 or device 830 from a manufacturer. The individual or organization may initiate a request to register the computing hub 812 or device 830 with the individual or an organization with which the organization is associated. The request may be routed to a web services server which may be comprised in device services environment 810 or which communicates the request to the device services environment 810. The request identifies the computing hub 812 or device 830 and the particular entity (individual or organization) that is requesting to be associated with the computing hub 812 or device 830. In one example, the request may comprise a unique identifier that was assigned when the computing hub 812 or device 830 was registered with the system. The request further may comprise information uniquely identifying the entity that is registering as having authority to communicate with and/or control the particular computing hub 812 or device 830.

The device security server 846 stores the information identifying the particular entity in relation with the identifier. When the particular entity subsequently attempts to control or communicate data to the particular computing hub 812 or device 830, the device security server 846 may use the information to confirm that the particular entity is authorized to communicate with or control the particular computing hub 812 or device 830. When an entity that has not been registered as being authorized to communicate with the computing hub 812 or device 830 attempts to communicate with or control the computing hub 812 or device 830, the device security server 846 may use the information stored in the device security server 846 to deny the request.

A network services server 850 may be any resource or processing server that may be used by any of servers 840, 842, or 846 in processing requests from the computing hubs 812 or devices 830. In one example, network services server 850 may provide data storage and retrieval services and/or on-demand processing capacity. In an example scenario, the network services server 850 may be any of numerous network accessible services including, for example, web or cloud-based services. In particular, the network services server 850 may host the distributed query services described earlier. Servers 840, 842, 846, and 850 may be communicatively coupled via any suitable networking hardware and software. For example, the servers may communicate via a local area network or wide area network.

An external system 860 may access device services environment 810 for any number of purposes. In one example, an external system 860 may be a system adapted to forward requests to register computing hubs 812 and/or devices 830 with the device services environment 810. For example, an external system 860 may include a server operated by or for a device manufacturer that sends requests to device services environment 810, and device security server 846 in particular, to register computing hubs 812 and/or devices 830 for operation with device services environment 810. Similarly, the external system 860 may be a system operated to provide a gateway for entities (individuals or organizations) to register an ownership or control relationship with a particular computing hub 812 or device 830.

A computing hub 812 may be any computing device that may be communicatively coupled via a network 820 with the device services environment 810 and may be capable of hosting computing hub services. In one example, a service provider may provide computing hub software to users who may install the computing hub software on one or more of computing devices. The computing hub software, when installed on a computing device included in a local device network, may extend service provider environment capabilities, such as messaging, computing, storage, etc. to devices 830 configured to connect to a computing hub 812, as well provide an environment to host and execute program code functions. In another example, a service provider may offer a physical pre-configured computing hub 812 to users. The users may add the computing hub 812 to a local device network in order to extend service provider environment capabilities and localized services (e.g., computing, storage, messaging, device shadowing services, machine learning, and other services) to devices 830 included in the local device network.

The devices 830 may be any device that may be communicatively coupled to a computing hub 812 or a device services environment 810. For example, the devices 830 may be computing devices such as smart phones and tablet computers, automobiles, appliances such as washers and driers, industrial sensors, switches, control systems, etc. The devices 830 may be part of a "network" that is commonly referred to as the Internet of Things (IoT). The devices that make up the network may be addressable over a wireless network, such as WI-FI, Zigbee, Z-Wave, BLUETOOTH, NFC (Near Field Communication), cellular, and the like. The devices 830 may be configured to communicate with computing resources located on a computing hub 812. While FIG. 8 depicts one computing hub 812 and three devices 830, it will be appreciated that any number of computing hubs 812 having connected devices 830 may access the device services environment 810 via the gateway server 840. Further it will be appreciated that the computing hubs 812 and devices 830 may employ various different communication protocols. For example, some computing hubs 812 and devices 830 may transport data using TCP, while others may communicate data using UDP. Some computing hubs 812 and devices 830 may use MQTT, while others may use CoAP, and still others may use HTTPs. It will also be appreciated that each of computing hubs 812 and devices 830 may be programmed to send and receive particular functions or commands in its requests that are not compatible with other devices or even the systems within device services environment 810. The gateway server 840 may be programmed to receive and, if needed, attend to converting such requests for processing with the device services environment 810.

Figure 9:
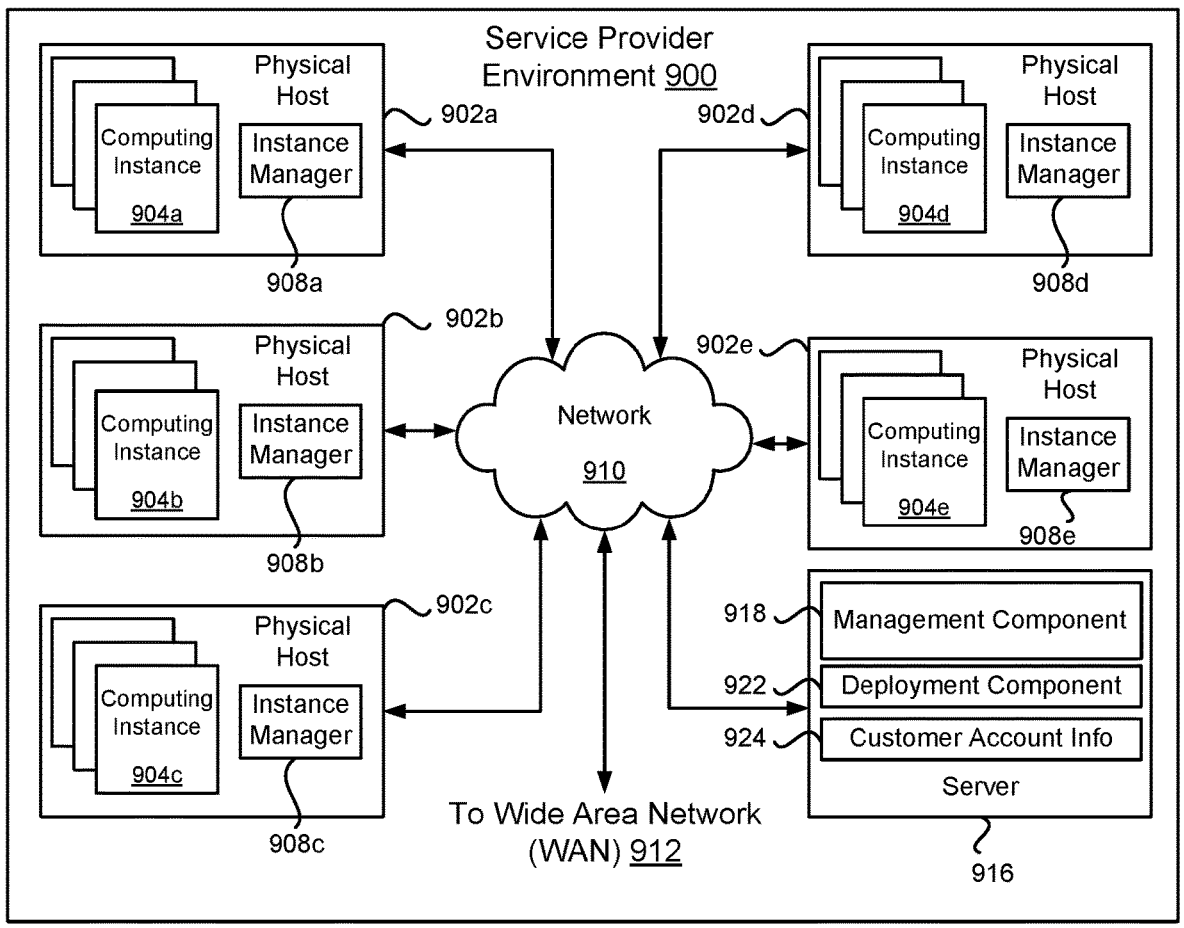
FIG. 9 is a block diagram that illustrates an example service provider environment.

FIG. 9 is a block diagram illustrating an example service provider environment 900 referenced earlier. In one example, the service provider environment 900 may include one or more computing instances 904*a-e* implemented on a physical host 902*a-e*. Also, in one example, the service provider environment 900 may be used to implement the device services environment described above. The service provider environment 900 may include computing resources that may include physical hosts 902*a-e*, computing instances 904*a-e*, virtualized services, and other types of computing resources which may be available for purchase and use by customers of a computing service provider. The computing resources may have many different configurations of processor capabilities, main memory, disk storage, and operating system. In particular, the service provider environment 900 depicted illustrates one environment in which the technology described herein may be used.

The service provider environment 900 may be one type of environment that includes various virtualized service resources that may be used, for instance, to host computing instances 904a-e. For example, the service provider environment 900 may offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or network services on a permanent or asneeded basis. The computing resources can also include, but are not limited to, computing instances 904a-e and images, security groups, option groups, gateways, option sets, network access control lists ("ACLs"), subnets, storage buckets, network interfaces, snapshots, spot market requests, and storage volumes.

The computing resources described above may be provided in one particular implementation by one or more data centers operated by a service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks 912 ("WANs"), such as the Internet.

The service provider environment 900 may be capable of delivery of computing, storage and networking capacity as a software service to a community of end recipients. In one example, the service provider environment 900 may be established for an organization by or on behalf of the organization. That is, the service provider environment 900 may offer a "private cloud environment." In another example, the service provider environment 900 may support a multi-tenant environment, wherein a plurality of customers may operate independently (i.e., a public cloud environment). Generally speaking, the service provider environment 900 may provide the following models: Infrastructure as a Service ("IaaS"), Platform as a Service ("PaaS"), and/or Software as a Service ("SaaS"). Other models may be provided. For the IaaS model, the service provider environment 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 900. End customers may access the service provider environment 900 using networked client devices, such as desktop computers, laptops, tablets, smartphones, etc. running web browsers or other lightweight client applications, for example. Those familiar with the art will recognize that the service provider environment 900 may be described as a "cloud" environment.

The particularly illustrated service provider environment 900 may include a plurality of servers 902a-e. While four servers are shown, any number may be used, and large data centers may include thousands of servers. The service provider environment 900 may provide computing resources for executing computing instances 904a-e. Computing instances 904a-e may, for example, be virtual machines. A virtual machine may be an instance of a software implementation of a machine (i.e. a computer) that executes applications like a physical machine. In the example of a virtual machine, each of the servers 902a-e may be configured to execute an instance manager 908a-e capable of executing the instances. The instance manager 908a-e may be a hypervisor, virtual machine monitor (VMM), or another type of program configured to enable the execution of multiple computing instances 904a-e on a single server. Additionally, each of the computing instances 904a-e may be configured to execute one or more applications.

One or more servers 916 may be reserved to execute software components for managing the operation of the service provider environment 900 and the computing instances 904a-e. For example, a server 916 may execute a management component 918. A customer may access the management component 918 to configure various aspects of the operation of the computing instances 904a-e purchased by a customer. For example, the customer may setup computing instances 904a-e and make changes to the configuration of the computing instances 904a-e.

A deployment component 922 may be used to assist customers in the deployment of computing instances 904a-e. The deployment component 922 may have access to account information associated with the computing instances 904a-e, such as the name of an owner of the account, credit card information, country of the owner, etc. The deployment component 922 may receive a configuration from a customer that includes data describing how computing instances 904a-e may be configured. For example, the configuration may include an operating system, provide one or more applications to be installed in computing instances 904a-e, provide scripts and/or other types of code to be executed for configuring computing instances 904a-e, provide cache logic specifying how an application cache should be prepared, and other types of information. The deployment component 922 may utilize the customer-provided configuration and cache logic to configure, prime, and launch computing instances 904a-e. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the service provider environment 900 and the servers 902a-e, 916. The network 910 may be a local area network (LAN) and may be connected to a Wide Area Network (WAN) 912 or the Internet, so that end customers may access the service provider environment 900. The network topology illustrated in FIG. 9 has been simplified, many more networks and networking devices may be utilized to interconnect the various computing systems disclosed herein.

Figure 10:
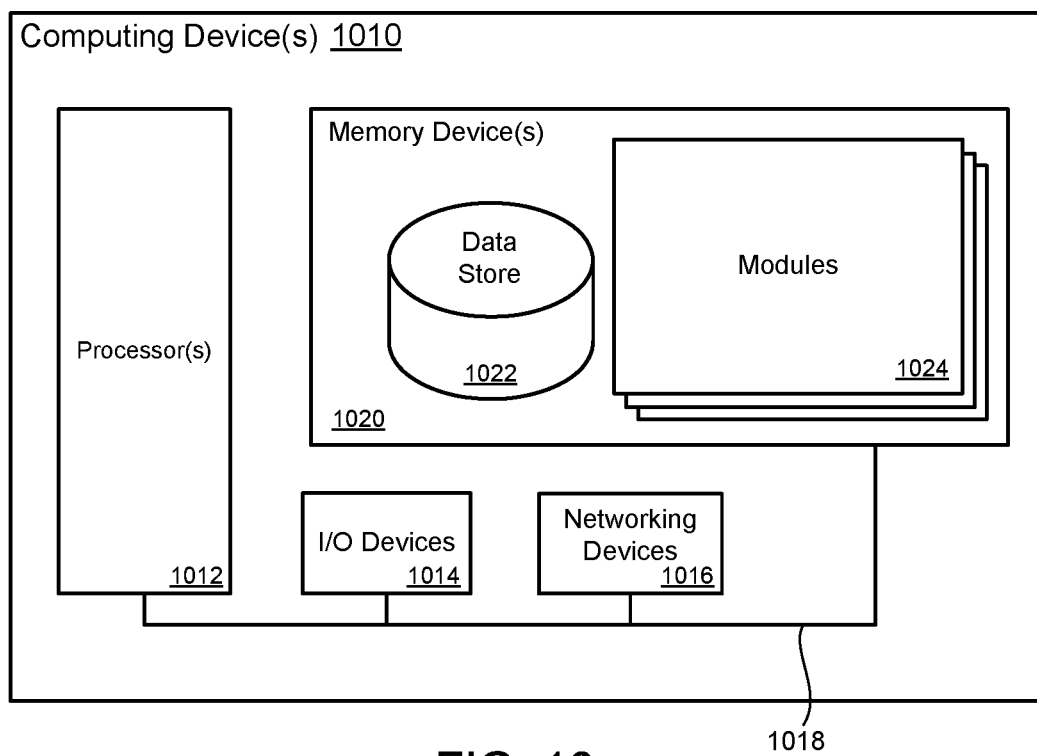
FIG. 10 is block diagram illustrating an example of a computing device that may be used to execute a method for distributed querying of computing hubs for device-generated data.

FIG. 10 illustrates a computing device 1010 on which service modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024 to provide various services. In one aspect, the memory device 1020 may include modules for a distributed query service, storage service, function service, or other services. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high-level programming languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system, comprising:
   at least one processor; and
   a memory device including instructions that, when executed by the at least one processor, cause the system to:
   receive, at a distributed query service located in a service provider environment, a request for device-generated data stored on computing hubs included in a local device network, wherein a plurality of devices included in the local device network generate and send the device-generated data to the computing hubs, wherein the computing hubs are configured to maintain connections with the plurality of devices included in the local device network, and storage services hosted on the computing hubs are used to store the device-generated data in data stores on the computing hubs;
   query computing hub profiles to identify the computing hubs that have the device-generated data stored on the computing hubs, wherein the computing hub profiles are maintained in the service provider environment and the computing hub profiles include information indicating which computing hubs contain the device-generated data, wherein the computing hubs are identified based at least in part on a determination that the computing hub profiles indicate that the computing hubs included in the local device network have the device-generated data, the device-generated data sent from one or more devices of the plurality of devices, wherein the device-generated data comprises sensor data of a type that satisfies the request, the sensor data generated by a device sensor of at least one device of the plurality of devices;
   send a message to the identified computing hubs that causes the computing hubs to execute program code functions to query the storage services on the computing hubs for the device-generated data, wherein
   at least one of the program code functions is constructed for execution on a computing hub configuration;
   receive the device-generated data from the computing hubs; and
   aggregate the device-generated data received from the computing hubs to form an aggregated data set.

2. The system as in claim 1, wherein the memory device includes instructions that, when executed by the at least one processor, cause the system to:
   receive a user-defined query for retrieving the device-generated data from the computing hubs;
   generate a program code function to execute the user-defined query; and
   distribute the program code function to the computing hubs that include the device-generated data, wherein the program code function is stored on the computing hubs and the program code function is executed in response to receiving the message at the computing hubs.

3. The system as in claim 2, wherein the memory device includes instructions that, when executed by the at least one processor, cause the system to:
   receive a named logical channel used to distribute the message to the computing hubs that causes the computing hubs to execute the program code function; and
   send a request to the computing hubs to subscribe to the named logical channel, wherein the request for the device-generated data includes the named logical channel.

4. The system as in claim 1, wherein the program code function executed on a computing hub sends the device-generated data obtained from a storage service on the computing hub to the distributed query service located in the service provider environment.

5. A computer implemented method, comprising:
   receiving a request for device-generated data which is stored on computing hubs that maintain a connection with devices included in a local device network, wherein the computing hubs host instances of a storage service to make the storage service available to the devices included in the local device network, wherein the devices generate and send the device-generated data to the computing hubs that host the instances of the storage service which are used to store the device-generated data in data stores on the computing hubs;
   querying computing hub profiles to identify the computing hubs that have the device-generated data stored on the computing hubs, wherein the computing hub profiles are maintained in a service provider environment and the computing hub profiles comprise information indicative of which computing hubs contain the device-generated data, wherein the computing hubs are identified based at least in part on the computing hub profiles indicating that the computing hubs have the device-generated data, wherein the device-generated data includes sensor data of a type that satisfies the request, the sensor data generated by one or more of the devices included in the local device network;
   sending a message with query instructions to the identified computing hubs to obtain the device-generated data from the instances of the storage service on the computing hubs;
   receiving the device-generated data from the computing hubs; and
   providing the device-generated data in response to the request.

6. The method as in claim 5, wherein providing the device-generated data further comprises aggregating the device-generated data received from the computing hubs to form an aggregated data set.

7. The method as in claim 5, wherein the computing hubs included in the local device network are organized in a computing hub hierarchy where a lower level computing hub sends the device-generated data to an upper level computing hub in the computing hub hierarchy and the device-generated data is aggregated with other device-generated data at the upper level computing hub.

8. The method as in claim 5, wherein querying the computing hub profiles to identify the computing hubs that have the device-generated data stored on the computing hubs further comprises querying an index of device-generated data contained on a computing hub to determine whether a computing hub contains the device-generated data.

9. The method as in claim 5, wherein querying the computing hub profiles to identify the computing hubs that have the device-generated data further comprises querying a computing hub profile to determine a state of a computing hub to provide the device-generated data.

10. The method as in claim 5, wherein the query instructions included in the message contain query parameters used by the instances of the storage service on the computing hubs to retrieve the device-generated data.

11. The method as in claim 10, further comprising:
analyzing the query parameters included in the message to determine whether the query parameters correspond to a naming convention recognized by the instances of the storage service on the computing hubs; and
modifying the query parameters that do not correspond to the naming convention to use the naming convention.

12. The method as in claim 5, wherein the query instructions included in the message instruct the computing hubs to execute a program code function on the computing hubs where the program code function is configured to query an instance of the storage service on a computing hub for the device-generated data satisfying the query instructions.

13. The method as in claim 5, further comprising:
receiving a program code function configured to query the storage service on a computing hub for the device-generated data; and
sending function deployment packages that include the program code function to the computing hubs, wherein the program code function is executed on the computing hubs in response to receiving the message at the computing hubs.

14. The method as in claim 5, wherein the query instructions included in the message sent to the computing hubs contain query parameters, and the query parameters are used by a computing hub to generate a program code function that, when executed, queries the storage service on a computing hub for the device-generated data.

15. The method as in claim 14, wherein generating the program code function to query the storage service on the computing hub for the device-generated data further comprises:
identifying computing resources contained on the computing hub; and
configuring the program code function to execute on the computing resources contained on the computing hub.

16. The method as in claim 5, wherein the request for the device-generated data is received at a distributed query service located in the service provider environment, and the distributed query service provides a query interface to the instances of the storage service hosted on the computing hubs.

17. A non-transitory machine readable storage medium including instructions embodied thereon, the instructions when executed by one or more processors:
receive instructions to deploy a program code function to a group of computing hubs included in a local device network, wherein the program code function is configured to query an instance of a storage service hosted on a computing hub for device-generated data received from a plurality of devices included in the local device network, wherein the computing hubs are configured to maintain a connection with the plurality of devices;
query computing hub profiles to identify the group of computing hubs that have the device-generated data stored on the group of computing hubs, wherein the computing hub profiles are maintained in a service provider environment and the computing hub profiles comprise information indicative of which computing hubs store the device-generated data, wherein the group of computing hubs are identified based at least in part on the computing hub profiles indicating that the group of computing hubs included in the local device network have the device-generated data received from one or more devices of the plurality of devices;
deploy the program code function to the group of computing hubs that have the device-generated data stored on the group of computing hubs;
receive a request for the device-generated data stored on the group of computing hubs;
send a message to the group of computing hubs which instructs the group of computing hubs to execute the program code function that queries instances of the storage service on the group of computing hubs to provide the device-generated data;
receive the device-generated data from the group of computing hubs; and
store the device-generated data in a user-accessible storage location.

18. The non-transitory machine readable storage medium in claim 17, further comprising instructions that when executed by the one or more processors cause the one or more processors to provide a query interface for constructing a query for device-generated data, wherein the query interface is hosted in the service provider environment, and the query interface displays computing hub information for device-generated data stored on computing hubs.

19. The non-transitory machine readable storage medium in claim 17, further comprising instructions that when executed by the one or more processors cause the one or more processors to:
receive a query for the device-generated data stored on the group of computing hubs;
identify data elements specified in the query that correlate to associated data elements recognized by the instance of the storage service on a computing hub included in the group of computing hubs; and
generate the program code function to execute the query that references the associated data elements recognized by the instance of the storage service on the computing hub.

20. The non-transitory machine readable storage medium in claim 17, further comprising instructions that when executed by the one or more processors cause the one or more processors to:

receive a query for the device-generated data stored on the group of computing hubs;
identify specific computing resources contained on a computing hub included in the group of computing hubs; and
generate the program code function to execute on the specific computing resources of the computing hub.

\* \* \* \* \*